Figure 1:
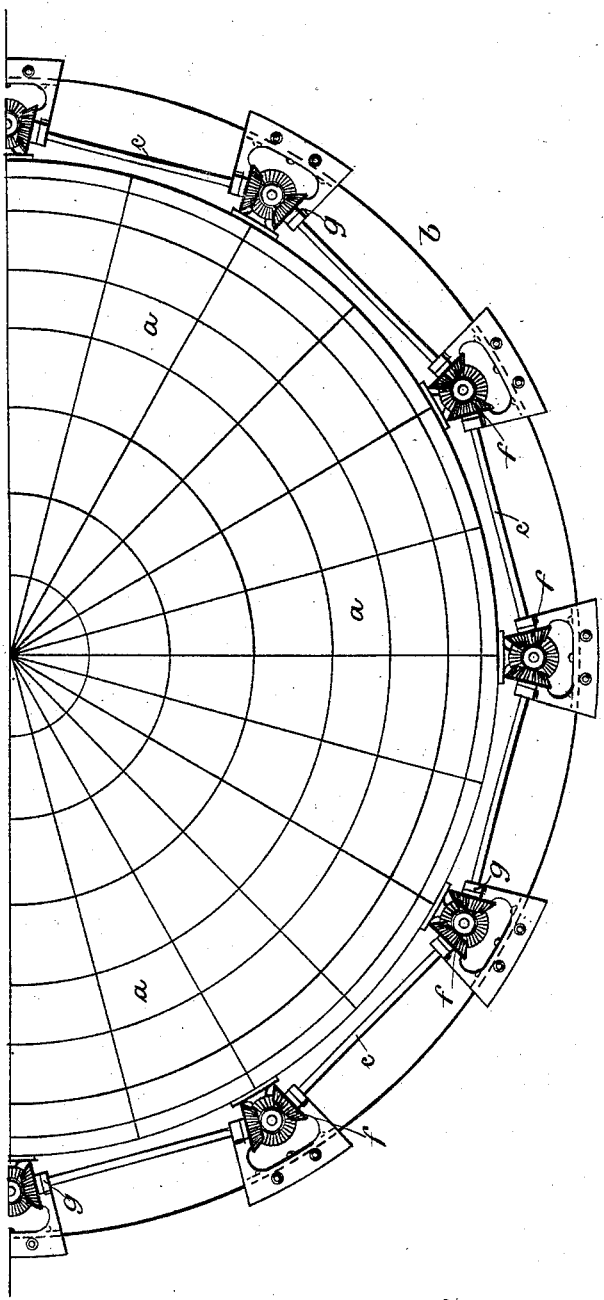

(No Model.)

6 Sheets—Sheet 1.

W. GADD.
GAS HOLDER.

No. 433,462. Patented Aug. 5, 1890.

Witnesses:
George Frederick Gadd.
John Groves Ward

Inventor:
William Gadd.

(No Model.) 6 Sheets—Sheet 3.

W. GADD.
GAS HOLDER.

No. 433,462. Patented Aug. 5, 1890.

Witnesses:
George Frederick Gadd.
John Groves Ward

Inventor:
William Gadd.

(No Model.)
6 Sheets—Sheet 4.
W. GADD.
GAS HOLDER.
No. 433,462. Patented Aug. 5, 1890.
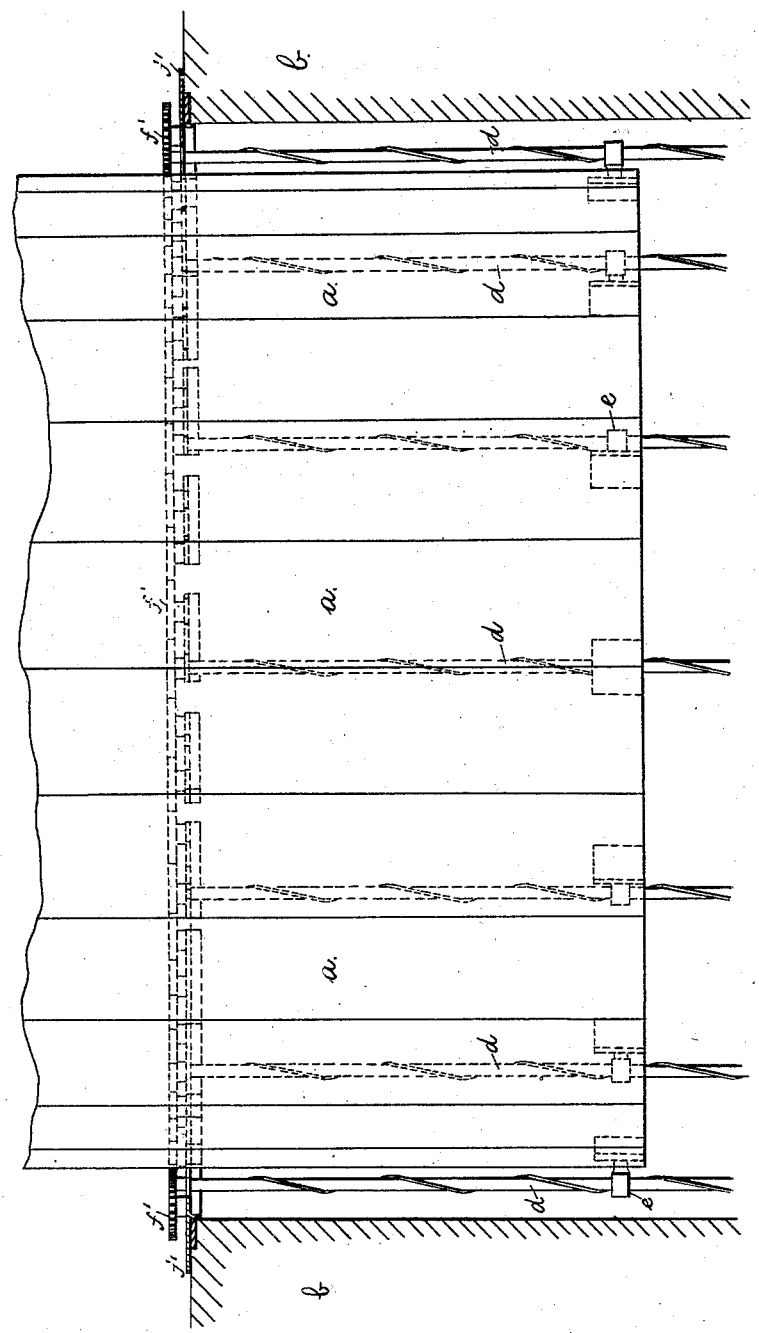
Witnesses:
George Frederick Gadd
John Groves Ward
Inventor:
William Gadd.

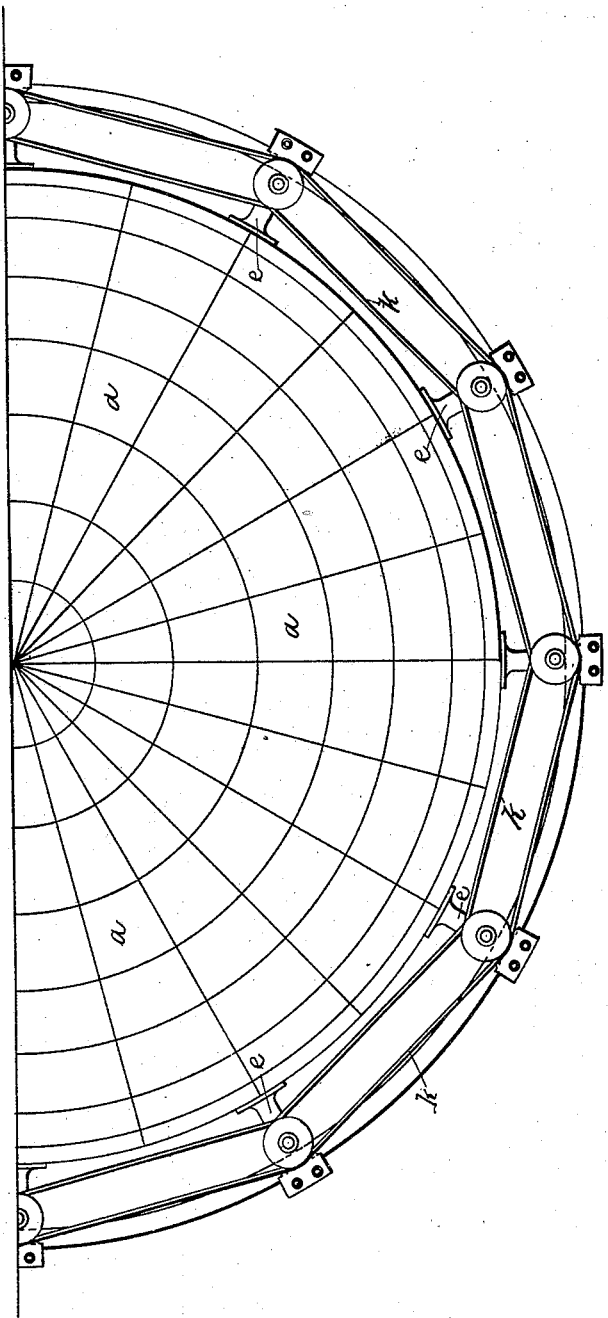

(No Model.) W. GADD. 6 Sheets—Sheet 6.
GAS HOLDER.
No. 433,462. Patented Aug. 5, 1890.
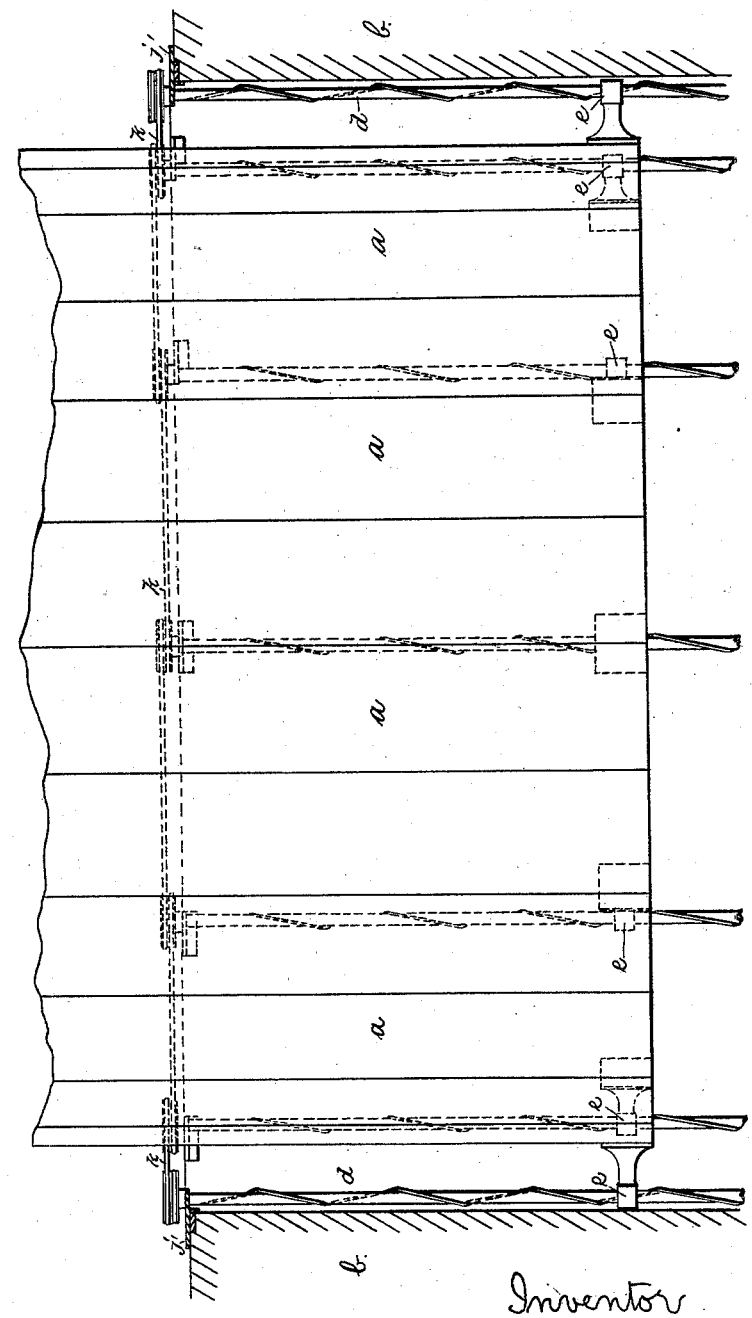
Witnesses:
George Frederick Gadd
John Groves Ward
Inventor
William Gadd.

UNITED STATES PATENT OFFICE.

WILLIAM GADD, OF MANCHESTER, ENGLAND.

GAS-HOLDER.

SPECIFICATION forming part of Letters Patent No. 433,462, dated August 5, 1890.

Application filed August 21, 1889. Serial No. 321,558. (No model.) Patented in England December 12, 1888, No. 18,119.

*To all whom it may concern:*

Be it known that I, WILLIAM GADD, a subject of the Queen of Great Britain, residing at the city of Manchester, England, have invented new and useful Improvements in Gas-Holders, (for which I have obtained provisional protection in Great Britain, No. 18,119, bearing date December 12, 1888,) of which the following is a specification.

The improvements relate to the construction of gas-holders, and have for their object the supporting of the same in their working position in such manner as to enable the external or upper guide-framing hitherto employed for that purpose to be dispensed with, and yet to give the requisite stability, although such, or a modified form of framing, may be employed in connection with the improvements herein described, when desired. To accomplish this and to effect my improvements, I fix round the face of the tank or well a series of bearings or journals, in which turn a series of vertical guides, which are constructed in the form of vertical screw-shafts of coarse or quick thread, such shafts terminating with toothed or other wheels for gearing purposes. At corresponding intervals round the lower curb or ring of the holder I mount suitable screw-studs, sockets, or screw-racks, which gear into or with the screw-shafts aforesaid. The wheels are geared together in such manner that when one is caused to turn the whole will turn therewith, and to the same extent, by which means, if the holder carrying or connected with these geared-up wheels and vertical screw-shafts moves upward or downward, it will be sustained in the same relative position at all heights. The like result is also obtained by fixing the vertical screw-shafts or equivalents to the outer face of the holder, and in like manner the method may be extended to telescopic holders. The wheels may be geared together either by shafts with bevel or other gearing intermediate between and turning in suitable journals, or by means of intermediate wheels in train, or by plain chain or rope or link-chain gearing, and, instead of the whole of the wheels being geared together, portions thereof may be geared as a modification.

Other variations in detail may be made without departing from the peculiar character of the invention, which consists in connecting, by means of suitable gearing, a number of vertical screw-shafts round the tank-wall, and operating therewith a corresponding number of points round the bottom curb of a gas-holder in such manner that when one point thereof tends to rise or fall the same tendency is transmitted, through such gearing, round the circle to every other point; but that the invention may be better understood I will, by aid of the accompanying drawings, proceed more fully to describe means employed by me.

Figure 2:
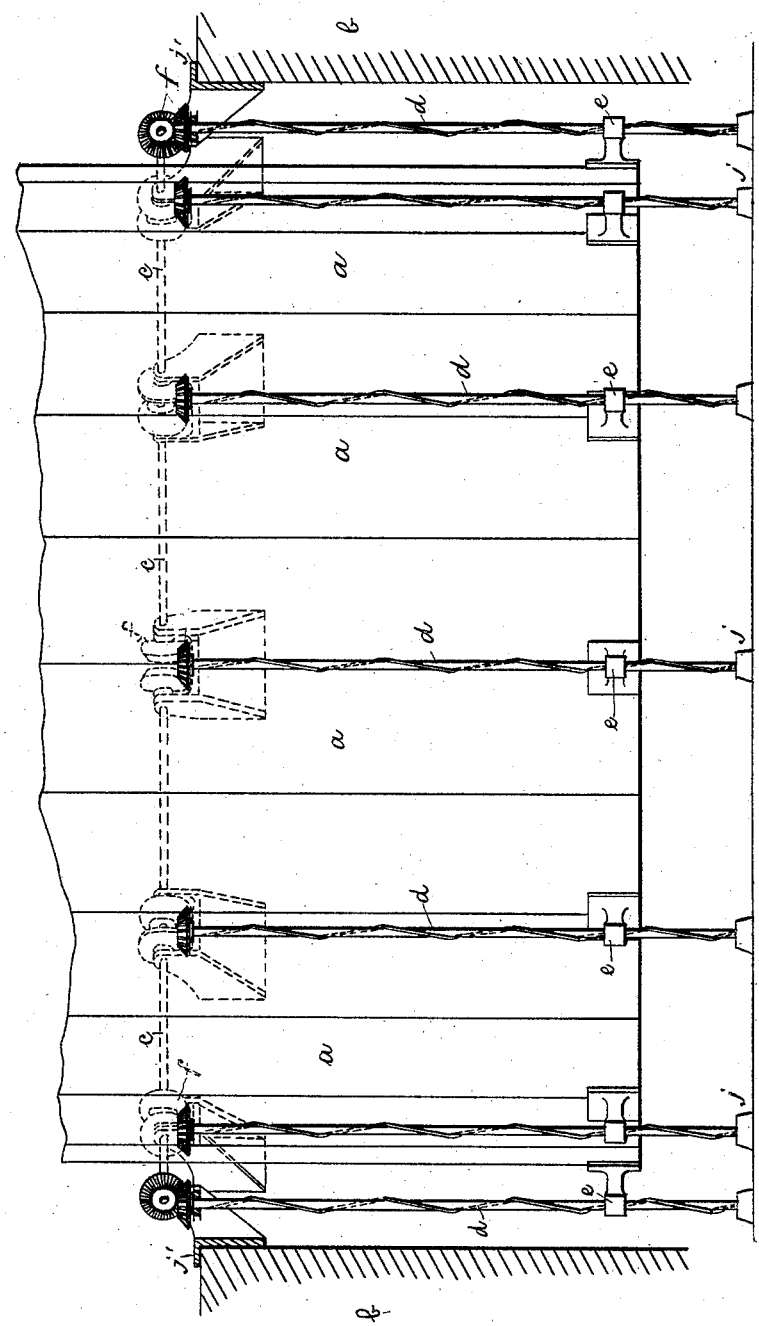
Figure 3:
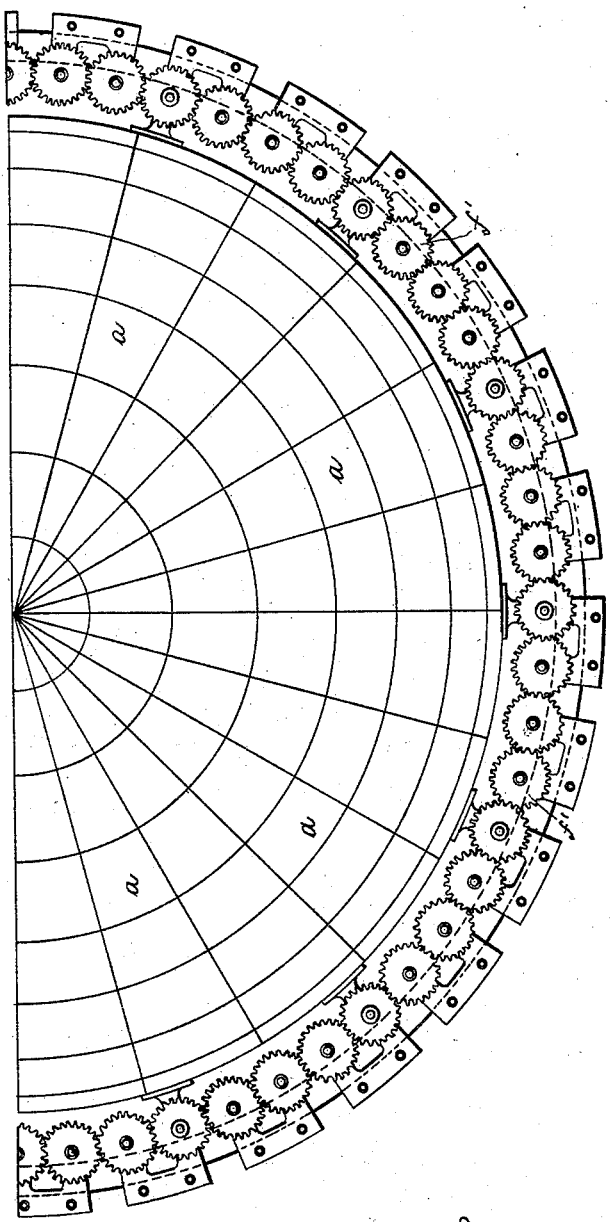

In the drawings, Figure 1 shows a plan view, and Fig. 2 a sectional elevation, of one arrangement of the improvements applied by means of wheel and shaft gearing. Fig. 3 shows a plan view, and Fig. 4 a sectional elevation, of another application by means of an intermediate train of geared wheels; while Fig. 5 shows a plan view, and Fig. 6 a sectional elevation, of a third application by means of tensional chain or wire-rope gearing.

The screw-shafts may also be connected by other forms of chain gearing by tangential pinions or angular geared wheels, or by a train of tangential wheels geared together round the holder.

The same letters indicate corresponding parts wherever they occur.

$a\ a$ is the holder or the bottom curb thereof, and $b\ b$ the tank side or wall.

$c\ c$ are the shafts mounted in journals or bearings $g\ g$ on the wall, carrying gearing-wheels $f\ f$, and $d\ d$ the screw-shafts, arranged at intervals round the tank and geared together, the shaft turning in journals or brackets $j'\ j'$. The beveled toothed wheels $f f$ and shafting, forming part of the ring of gearing, are completed by the vertical quick-threaded screw-shafts actuating short screw-racks or screw-sockets $e\ e$, which in the example shown are attached at intervals round the holder or near the bottom curb. In like manner in Figs. 3 and 4 the toothed wheels $f f$ gear the screw shafts or guides together, and in Figs. 5 and 6 the chains or bands $k\ k$ perform the same function; but this gearing may be either attached, as shown, to the tank-wall or to the holder side in reverse.

It will be obvious that other varieties of arrangements of gearing may be employed and combinations thereof, which, like those shown, are mechanical equivalents of each other, the object and operation of all of them being to gear the different actuating-points round the circle of the holder together in such manner that when the holder carrying or carried by the geared wheels, whether toothed or plain, and fixed at intervals round the circle, moves upward or downward it will be sustained in the same relative position at all heights. The ring of gearing may be complete, or partial, or in sections, and the wheels may be arranged either tangentially, radially, or in any angle which may be desired, and the tank and holder may be and are, by preference to insure easy working, fitted with rollers and plain guides, in addition to the gearing shown and described, without departing from the peculiar character of the invention.

Having now particularly described and ascertained the nature of my said invention, and in what manner the same is to be performed, I declare that what I claim as my invention, and desire to secure by Letters Patent, is—

1. In a gas-holder, the screw-shafts $d\ d$ and the shafts and toothed wheels $c\ c$, all mounted in journals attached to the tank face or wall, forming gearing arranged round a gas-holder tank, combined with the screw-sockets $e\ e$, attached to the holder and forming gearing which connects or gears together points upon and at intervals around the holder, so that one point moving upward or downward communicates through such gearing the tendency of motion to the other points round the holder, for the purpose and in manner substantially as herein set forth.

2. In a gas-holder, the screw-shafts $d\ d$, connected by gearing arranged round and attached to a gas-holder tank, combined with the screw-socket $e\ e$, attached to the holder and forming gearing which connects or gears together points upon and at intervals around the holder, so that one point moving upward or downward communicates through such gearing the tendency of motion to the other points round the holder, for the purpose and in manner substantially as herein set forth.

WILLIAM GADD.

Witnesses:
GEORGE FREDERICK GADD,
CHARLES LARGE.